United States Patent
Xuan et al.

(10) Patent No.: US 12,423,774 B2
(45) Date of Patent: Sep. 23, 2025

(54) IMAGE PROCESSING METHOD, APPARATUS, AND SYSTEM

(71) Applicant: SHENZHEN YINWANG INTELLIGENT TECHNOLOGIES CO., LTD., Shenzhen (CN)

(72) Inventors: Zhangyang Xuan, Shenzhen (CN); Hang Sun, Shenzhen (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 512 days.

(21) Appl. No.: 17/854,452

(22) Filed: Jun. 30, 2022

(65) Prior Publication Data

US 2022/0335583 A1 Oct. 20, 2022

Related U.S. Application Data

(63) Continuation of application No. PCT/CN2020/127994, filed on Nov. 11, 2020.

(30) Foreign Application Priority Data

Dec. 31, 2019 (CN) .......................... 201911416486.6

(51) Int. Cl.
*G06T 5/20* (2006.01)
*G06T 3/40* (2006.01)
(Continued)

(52) U.S. Cl.
CPC .................. *G06T 5/20* (2013.01); *G06T 3/40* (2013.01); *G06T 5/90* (2024.01); *G06V 10/764* (2022.01);
(Continued)

(58) Field of Classification Search
CPC .... G06T 5/20; G06T 5/90; G06T 3/40; G06T 2207/20081; G06T 2207/20084; G06T 2207/20208; G06V 10/7715; G06V 10/764
(Continued)

(56) References Cited

U.S. PATENT DOCUMENTS

| | | | |
|---|---|---|---|
| 8,503,792 | B2 | 8/2013 | Zhang et al. |
| 2016/0078057 | A1 | 3/2016 | Perez De La Coba |

(Continued)

FOREIGN PATENT DOCUMENTS

| | | | |
|---|---|---|---|
| CN | 105447190 | A | 3/2016 |
| CN | 107316066 | A | 11/2017 |

(Continued)

OTHER PUBLICATIONS

Li Hui et al., "Face Recognition Algorithm Based on Convolutional Neural Network", Software Guide, vol. 16, No. 3, Mar. 2017, with an English abstract, total 5 pages.

(Continued)

*Primary Examiner* — William D Titcomb
(74) *Attorney, Agent, or Firm* — Leydig, Voit & Mayer, Ltd.

(57) ABSTRACT

An image processing method, apparatus, and system are provided. The image processing method includes: obtaining an initial image; converting the initial image from one type to another based on an image feature of the initial image, to obtain a target image; and presenting the target image, or analyzing and processing the target image. The initial image can be processed based on the image feature of the initial image, to obtain another type of image.

20 Claims, 4 Drawing Sheets

(51) Int. Cl.
  *G06T 5/90* (2024.01)
  *G06V 10/764* (2022.01)
  *G06V 10/77* (2022.01)

(52) U.S. Cl.
  CPC .................... *G06V 10/7715* (2022.01); *G06T 2207/20081* (2013.01); *G06T 2207/20084* (2013.01); *G06T 2207/20208* (2013.01)

(58) Field of Classification Search
  USPC ........................................................ 382/254
  See application file for complete search history.

(56) References Cited

U.S. PATENT DOCUMENTS

| | | | |
|---|---|---|---|
| 2017/0286801 A1* | 10/2017 | Rampal | G06T 7/251 |
| 2018/0218198 A1 | 8/2018 | Hushchyn et al. | |
| 2018/0307912 A1* | 10/2018 | Selinger | G06V 20/41 |
| 2019/0347767 A1 | 11/2019 | Yang | |
| 2021/0272236 A1* | 9/2021 | Wang | G06T 5/00 |
| 2022/0012855 A1* | 1/2022 | Kim | G06T 5/50 |

FOREIGN PATENT DOCUMENTS

| | | |
|---|---|---|
| CN | 107529650 A | 1/2018 |
| CN | 107545263 A | 1/2018 |
| CN | 108334892 A | 7/2018 |
| CN | 109919869 A | 6/2019 |
| CN | 110222718 A | 9/2019 |
| CN | 110532871 A | 12/2019 |
| CN | 110555446 A | 12/2019 |
| CN | 110570383 A | 12/2019 |
| CN | 111145097 A | 5/2020 |
| WO | 2019112085 A1 | 6/2019 |

OTHER PUBLICATIONS

International Search Report and Written Opinion issued in PCT/CN2020/127994, dated Feb. 10, 2021, 12 pages.

Extended European Search Report issued in EP20909573.6, dated Jan. 5, 2023, 8 pages.

Office Action issued in CN201911416486.6, dated Jan. 13, 2023, 12 pages.

Notice of Allowance issued in CN201911416486.6, dated Jun. 8, 2023, 4 pages.

* cited by examiner

IMAGE PROCESSING METHOD, APPARATUS, AND SYSTEM

CROSS-REFERENCE TO RELATED APPLICATIONS

This application is a continuation of International Application No. PCT/CN 2020/127994, filed on Nov. 11, 2020, which claims priority to Chinese Patent Application No. 201911416486.6, filed on Dec. 31, 2019. The disclosures of the aforementioned applications are hereby incorporated by reference in their entireties.

TECHNICAL FIELD

This application relates to the field of image processing technologies, and more specifically, to an image processing method, apparatus, and system.

BACKGROUND

Because display effects of different types of images may be different, it is usually necessary to process an image, to convert an image from one type to another, so as to facilitate subsequent processing or analysis. Therefore, how to better convert an image from one type to another is a problem that needs to be resolved.

SUMMARY

This application provides an image processing method, apparatus, and system, to convert an image from one type to another based on an image feature.

According to a first aspect, an image processing method is provided. The image processing method includes: obtaining an initial image: obtaining a target image based on an image feature of the initial image; and presenting the target image or analyzing and processing the target image.

The initial image is an image of a first type, the target image is an image of a second type, and the initial image and the target image may be images of different types.

In a possible implementation, a resolution of the target image is higher than a resolution of the initial image.

In other words, the initial image may be a low-resolution image, and the target image may be a high-resolution image. The resolution of the initial image can be increased through the method in the first aspect, to obtain the high-resolution target image.

In another possible implementation, image quality of the target image is higher than image quality of the initial image.

In other words, the initial image may be a low-quality image, and the target image may be a high-quality image. According to the method in the first aspect, the low-quality initial image can be restored to the high-quality target image.

In another possible implementation, the initial image is a standard dynamic range (SDR) image, and the target image is a high dynamic range (HDR) image.

In this embodiment of this application, the initial image can be processed based on the image feature of the initial image, to obtain another type of image.

In another possible implementation, the obtaining a target image based on an image feature of the initial image includes: obtaining the target image based on a global image feature and a local image feature of the initial image.

In another possible implementation, the obtaining the target image based on a global image feature and a local image feature of the initial image includes: obtaining a final feature map of the initial image based on the global image feature and the local image feature of the initial image; and performing upsampling multiple times on the final feature map of the initial image, to obtain the target image.

The local image feature of the initial image may be a feature of a local area in the initial image.

For example, when one area in the initial image includes a person and another area includes a cat, the local image feature of the initial image may include a contour feature of the cat in one area, and a contour feature of the person in the another area.

The global image feature of the initial image may be an overall image feature of the initial image, for example, illumination intensity and tone of the initial image.

Generally, a global feature of an image indicates advanced information of the image. For example, the global feature of the image may include a scene category, a theme type, or an overall illumination condition of the image, and such information is useful for a single pixel of the image to determine a local adjustment.

In another possible implementation, the obtaining a final feature map of the initial image based on the global image feature and the local image feature of the initial image includes: splicing the global image feature and the local image feature of the initial image to obtain the final feature map of the initial image.

For example, assuming that a size of the global image feature of the initial image is (1, 1, Z), and a size of the local image feature of the initial image is (P, Q, Z). During splicing, P×Q copies of each channel of the global image feature of the initial image may be first duplicated, and then the duplicated global image feature is connected to the layout image feature in a channel dimension, to obtain the final feature map with a size (P, Q, 2Z). The width and the height of the global image feature are both 1, and a quantity of channels is Z. The width and the height of the local image feature are P and Q, respectively, and a quantity of channels is Z. The width and the height of the final feature image obtained after splicing are P and Q, respectively, and a quantity of channels is 2Z.

In this way, the global image feature and the local image feature of the initial image are spliced, to obtain the final feature map that integrates the global feature and the local feature of the initial image.

In another possible implementation, the foregoing method further includes: obtaining the global image feature of the initial image.

The global image feature of the initial image is determined based on a second feature map of the initial image, and the second feature map of the initial image is obtained through adaptive pooling for a first feature map of the initial image, the first feature map of the initial image is obtained through convolution processing on the initial image, and the second feature map of the initial image is a fixed-size feature map.

In another possible implementation, the local image feature of the initial image is obtained through convolution processing on the initial image.

If convolution processing is performed multiple times, the layout image feature of the initial image may include an image feature obtained through convolutions on the initial image.

In another possible implementation, the obtaining the global image feature of the initial image includes:

obtaining the first feature map of the initial image: performing adaptive pooling on the first feature map based on a size of the first feature map to obtain the second feature map; and determining the global image feature of the initial image based on the second feature map.

The first feature map is obtained after $L^{th}$ convolution processing is performed on the initial image, the size of the first feature map is M×N, and L, M, and N are all positive integers. A size of the second feature map is R×S, where R and S are preset fixed values and positive integers.

As adaptive pooling is performed on the first feature map to obtain the second feature map of a fixed size, the global image feature of the initial image is subsequently determined based on the second feature map of the fixed size.

In this embodiment of this application, the adaptive pooling is performed on the feature map of the initial image to obtain the feature map of the fixed size. This facilitates subsequent extraction of the global image feature of the initial image, to improve flexibility of image processing.

Specifically, during image processing, it is usually necessary to obtain the global image feature of the image, but obtaining global image features of images of different sizes usually needs networks or generators of different structures. Therefore, before the global feature of the image is obtained, the image is first processed to obtain the feature map of the fixed size, and then the image global feature is extracted based on the feature map of the fixed size. This can greatly improve flexibility of the image processing, and enable a network or an image processor of a same structure to extract the global image features of the images of different sizes, so as to implement flexible processing on the images of different sizes.

In another possible implementation, the performing adaptive pooling on the first feature map based on a size of the first feature map to obtain the second feature map includes: performing pooling on the first feature map by using a sliding window, to obtain the second feature map.

A size of the sliding window and a sliding step of the sliding window are determined based on the sizes of the first feature map and the second feature map.

Optionally, the step of the sliding window is positively correlated with the size of the first feature map.

A larger first feature map indicates a larger step of the sliding window.

Optionally, the size of the sliding window is positively correlated with the size of the first feature map.

A larger first feature map indicates a larger sliding window.

The size of the sliding window is not fixed, but can be flexibly set based on the size of the first feature map.

With reference to the first aspect, in some implementations of the first aspect, the size of the sliding window and the sliding step of the sliding window are determined according to the following formulas:

$$s\_h=M//R;$$

$$s\_w=N//S;$$

$$k\_h=M-(R-1)*s\_h; \text{ and}$$

$$k\_w=N-(S-1)*s\_w, \text{ where}$$

the size of the sliding window is (k_h, k_w), the sliding step of the sliding window is (s_h, s_w), and // represents exact division.

In addition, k_h and k_w respectively represent the height and the width of the sliding window, and s_h and s_w respectively represent horizontal and vertical sliding steps of the sliding window.

It can be learned from the foregoing formula that the vertical sliding step (s_h) of the sliding window is positively correlated with the width (M) of the first feature map.

It can be learned from the foregoing formula that the horizontal sliding step (s_w) of the sliding window is positively correlated with the height (N) of the first feature map.

It can be learned from the foregoing formula that the height (k_h) of the sliding window is positively correlated with the width (M) of the first feature map.

It can be learned from the foregoing formula that the width (k_w) of the sliding window is positively correlated with the height (N) of the second feature map.

The size of the sliding window is not fixed, but may be flexibly determined based on sizes of an image before and after the pooling. Feature maps of different sizes can be pooled by adjusting the size of the sliding window, to obtain a feature map of a fixed size. This increases flexibility of processing images of different sizes.

In another possible implementation, the analyzing and processing the target image includes: performing image classification or recognition processing on the target image, to obtain a processing result of the image.

The initial image is converted from one type to another, so that image classification or recognition is subsequently performed more flexibly on the target image obtained through conversion.

For example, when the initial image is a low-quality image and the target image is a high-quality image, the initial image is converted from the low-quality image to the high-quality image, so that the image is better classified or recognized subsequently, and an image classification or recognition effect can be improved.

According to a second aspect, an image processing apparatus is provided. The apparatus includes modules configured to perform the image processing method in the first aspect or any one of the possible implementations of the first aspect.

According to a third aspect, a controller is provided. The controller includes: a storage, configured to store a program; and a processor, configured to execute the program stored in the storage. When the program stored in the storage is executed, the processor is configured to perform the operation steps of any one of the methods in the first aspect.

According to a fourth aspect, an image processing system is provided. The image processing system includes at least one virtual machine, and the at least one virtual machine is configured to perform operation steps of any one of the methods in the first aspect.

According to a fifth aspect, an electronic device is provided. The electronic device includes the image processing apparatus according to the second aspect.

In the fifth aspect, the electronic device may be specifically a mobile terminal (for example, a smartphone), a tablet computer, a notebook computer, an augmented reality/virtual reality device, an in-vehicle terminal device, or the like.

According to a sixth aspect, a computer-readable storage medium is provided. The computer-readable storage medium stores program code, and the program code includes instructions for performing a step of any one of the methods in the first aspect.

According to a seventh aspect, a chip is provided. The chip includes a processor and a data interface, and the processor reads instructions stored in a storage through the data interface, to perform any one of the methods in the first aspect.

Optionally, in an implementation, the chip may further include a storage and the storage stores instructions: the processor is configured to execute the instructions stored in the storage, and when the instructions are executed, the processor is configured to perform any one of the methods in the first aspect.

The chip may be specifically a field programmable gate array (FPGA) or an application-specific integrated circuit (ASIC).

In this application, based on the implementations provided in the foregoing aspects, the implementations may be further combined to provide more implementations.

DESCRIPTION OF EMBODIMENTS

Figure 1:
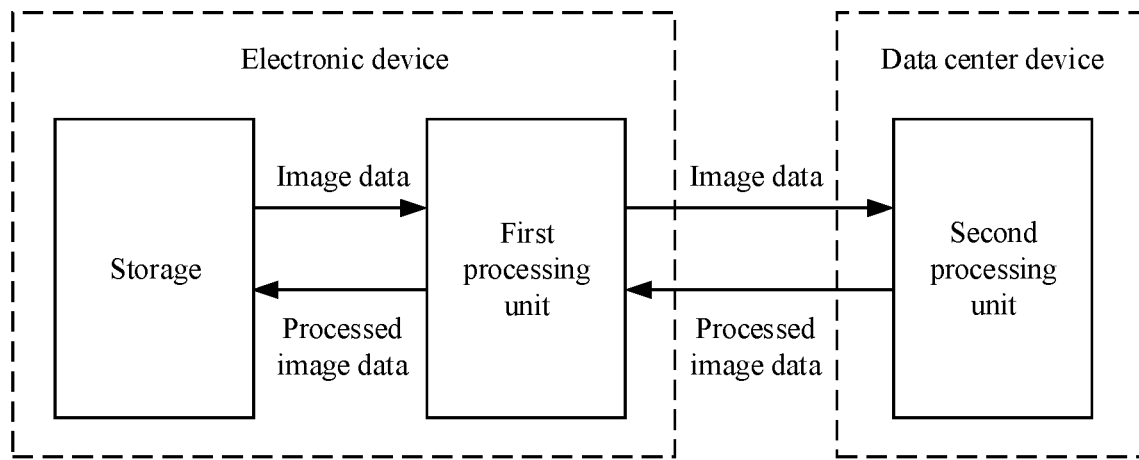
FIG. 1 is a schematic diagram of a possible application scenario according to an embodiment of this application.

The following describes technical solutions of this application with reference to accompanying drawings.

The solutions of this application may be applied to fields that require image processing in computer vision, such as an intelligent vehicle with assisted driving or autonomous driving technology, a safe city, and an intelligent terminal. Specifically, in the solutions of this application, a low-quality image may be processed into a high-quality image, or a low-resolution image may be processed into a high-resolution image, or an SDR image may be converted to an HDR image. For example, images in different formats need to be converted in an intelligent vehicle. Alternatively, when a video is played by using a player of an intelligent terminal (for example, a mobile phone), an SDR image often needs to be converted to an HDR image to improve a display effect. In addition, in the field of security protection, an image shot by a surveillance camera usually has low quality, which affects accuracy of identifying a target and determining an event by a person or a recognition algorithm. Therefore, resolution and definition of the images need to be improved, that is, the images need to be processed, so that accurate determining is subsequently performed based on the restored images.

In the solutions of this application, image processing may be performed by using a neural network (model). To better understand the solutions of this application, the following first describes related terms and concepts related to the neural network.

(1) Neural Network

The neural network may include a neuron. The neuron may be an operation unit that uses $x_s$ and an intercept 1 as an input, and an output of the operation unit may be shown in the following formula:

$$h_{W,b}(x)=f(W^T x)=f(\Sigma_{s=1}^{n} W_s x_s + b)$$

Herein, $s=1, 2, \ldots, n$, n is a natural number greater than 1, $W_s$ represents a weight of $x_s$, b represents a bias of the neuron, and f is an activation function of the neuron, and the activation function is used to perform non-linear transformation on a feature in the neural network, to convert an input signal in the neuron to an output signal. The output signal of the activation function may be used as an input to a next convolutional layer, and the activation function may be a sigmoid function. The neural network is a network constituted by connecting a plurality of single neurons together. To be specific, an output of a neuron may be an input to another neuron. An input to each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on positions of different layers. Neural networks inside the DNN may be classified into three types: an input layer, a hidden layer, and an output layer. Generally, a first layer is the input layer, a last layer is the output layer, and a middle layer is the hidden layer. Layers are fully connected. To be specific, any neuron in an $i^{th}$ layer is necessarily connected to any neuron in an $(i+1)^{th}$ layer.

Although the DNN seems complex, work of each layer is actually not complex. It can be simply expressed by the following linear relational expression: $\vec{y}=\alpha(W\square\vec{x}+\vec{b})$. $\vec{x}$ represents an input vector, $\vec{y}$ represents an output vector, $\vec{b}$ represents a bias vector, W represents a weight matrix (which is also referred to as a coefficient), and $\alpha(\ )$ represents an activation function. At each layer, only such a simple operation is performed on the input vector $\vec{x}$ to obtain the output vector $\vec{y}$. Due to a large quantity of DNN layers, quantities of coefficients W and bias vectors $\vec{b}$ are also large. These parameters are defined in the DNN as follows: The coefficient W is used as an example. It is assumed that in a three-layer DNN, a linear coefficient from a fourth neuron in a second layer to a second neuron at a third layer is defined as $W_{24}^{3}$. A superscript 3 represents an ordinal number of a layer at which the coefficient W is located, and a subscript corresponds to an index 2 of the third layer for output and an index 4 of the second layer for input.

In conclusion, a coefficient from a $k^{th}$ neuron in an $(L-1)$th layer to a $j^{th}$ neuron in an $L^{th}$ layer is defined as $W_{jk}^{L}$.

It should be noted that the input layer has no parameter W. In the deep neural network, more hidden layers allow the network to better describe a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolution layer is a neuron layer, in a convolutional neural network, that performs convolution processing on an input signal. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing a weight may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, sharing the weight is advantageous because connections between layers of the convolutional neural network are reduced, and a risk of overfitting is reduced.

(4) Residual Network

A residual network is a deep convolutional network first proposed in 2015. Compared with a conventional convolutional neural network, a residual network is easier to optimize and can enhance accuracy by increasing a larger depth. Essentially, a residual network resolves side effects (deterioration) brought by a depth increase. In this way, network performance can be improved by simply increasing a network depth. A residual network generally includes a plurality of submodules with a same structure. A residual network (ResNet) plus a number indicates a quantity of times of submodule repetition. For example, ResNet 50 represents that there are 50 submodules in a residual network.

(5) Classifier

Many neural network structures have a classifier at the end to classify an object in an image. A classifier generally includes a fully connected layer and a softmax function (which may be referred to as a normalized exponential function), and can output probabilities of different classes based on input.

(6) Loss Function

In a process of training the deep neural network, because it is expected that an output of the deep neural network is as close as possible to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, a parameter is preconfigured for each layer of the deep neural network). For example, if the predicted value of the network is large, the weight vector is adjusted to decrease the predicted value. The weight vector is continuously adjusted until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network becomes a process of reducing the loss as much as possible.

(7) Back Propagation Algorithm

The neural network may correct a value of a parameter in an initial neural network model in a training process by using an error back propagation (BP) algorithm, so that an error loss of reconstructing the neural network model becomes increasingly smaller. Specifically, an input signal is forward transferred until an error loss occurs during output, and the parameters in the initial neural network model are updated based on back propagation error loss information, so that the error loss is reduced. The back propagation algorithm is a back propagation motion mainly dependent on the error loss, and is used to obtain parameters of an optimal neural network model, for example, a weight matrix.

FIG. 1 is a schematic diagram of a possible application scenario according to an embodiment of this application. As shown in the figure, a first processing unit obtains image data (the image data may be an image that needs to be processed) from a storage, and transmits the image to a second processing unit. After obtaining the image data, the second processing unit processes the image data, to obtain the processed image data. As such, the processing on the image data is completed. Then, the second processing unit transmits the processed image data to the first processing unit. After obtaining the processed image data, the first processing unit saves the processed image data in the storage.

The first processing unit and the storage may be located in an electronic device. The second processing unit may be located in a data center device. Before transmitting the image data to the second processing unit, the first processing unit may further preprocess the image data, and then transmit the preprocessed image data to the second processing unit. The electronic device may be a vehicle-mounted controller, or a server with the first processing unit or the second processing unit. The server is used in the field of security protection, and is configured to collect images collected by a camera or a shooting device, and perform an image processing process.

The data center device may be a device located in a cloud, and the electronic device and the data center device may transmit data through wireless communication. The electronic device may upload a to-be-processed image of the user to the data center device for processing, and the data center device feeds back the processed image to the electronic device.

The data center device may be a server or another computer device that has an image processing capability.

The first processing unit may transmit an initial image to the second processing unit. After receiving the initial image, the second unit may perform the following processing on the initial image:

(1) performing convolution processing on the initial image at least once to obtain a first feature map of the initial image;

(2) performing adaptive pooling on the first feature map by using a sliding window that matches a size of the first feature map, to obtain a second feature map;

(3) determining a global image feature of the initial image based on the second feature map; and (4) splicing the global image feature and a local image feature of the initial image to obtain the final feature map of the initial image, and performing upsampling multiple times on the final feature map of the initial image, to obtain a target image.

Optionally, the initial image may be an SDR image, and the target image may be an HDR image.

If the initial image is an SDR image and the target image is an HDR image, the SDR image can be converted to the HDR image through the foregoing processing process, to improve a display effect of the image.

The following briefly describes the HDR image and the SDR image.

With development of computer graphics and screen display technologies, display screens of many electronic devices have gradually started to support HDR technologies. The HDR technologies allow an image and a video to have a brighter visual effect and more obvious details. Compared with a common image, the HDR image can provide more dynamic ranges and image details. Based on low dynamic range (LDR) images with different exposure time, a final HDR image is synthesized by using LDR images with best details corresponding to each exposure time. This can better reflect a visual effect in a real environment. Currently, the commonly used HDR is 10-bit color.

Generally, the brightness range that can be perceived by human eyes is about 10-3-106 nit, and the instantaneous contrast range that can be perceived by human eyes is up to 10000:1. However, currently, luminance of consumer-level (LCDs) ranges from 300 to 400 candelas per square meter ($cd/m^2$) (or referred to as nits), and a luminance range thereof is generally 2000:1. Therefore, a brightness resolution capability of human eyes is far higher than that of a current mainstream display device. The HDR display technology increases a displayed luminance range, so that people can see more gorgeous image colors.

However, an HDR image and video are produced at high costs. A large quantity of existing videos on major video websites are 8-bit SDR videos. An SDR image is displayed by using a conventional gamma (EOTF) curve, and the SDR image generally has an 8-bit color depth. As such, converting a large number of existing SDR videos on an existing network to HDR videos becomes an urgent and valuable task.

It should be understood that the first processing unit and the second processing unit may also be located in one device at the same time. For example, both the first processing unit and the second processing unit may be located in a same terminal device. In this case, the terminal device can process the initial image.

The first processing unit may be a central processing unit (CPU). The second processing unit may be a GPU or another processing unit that can perform image processing.

Optionally, the second processing unit processes the initial image by using the dual-path cycle generative adversarial network (CycleGAN), to obtain the target image.

Figure 2:
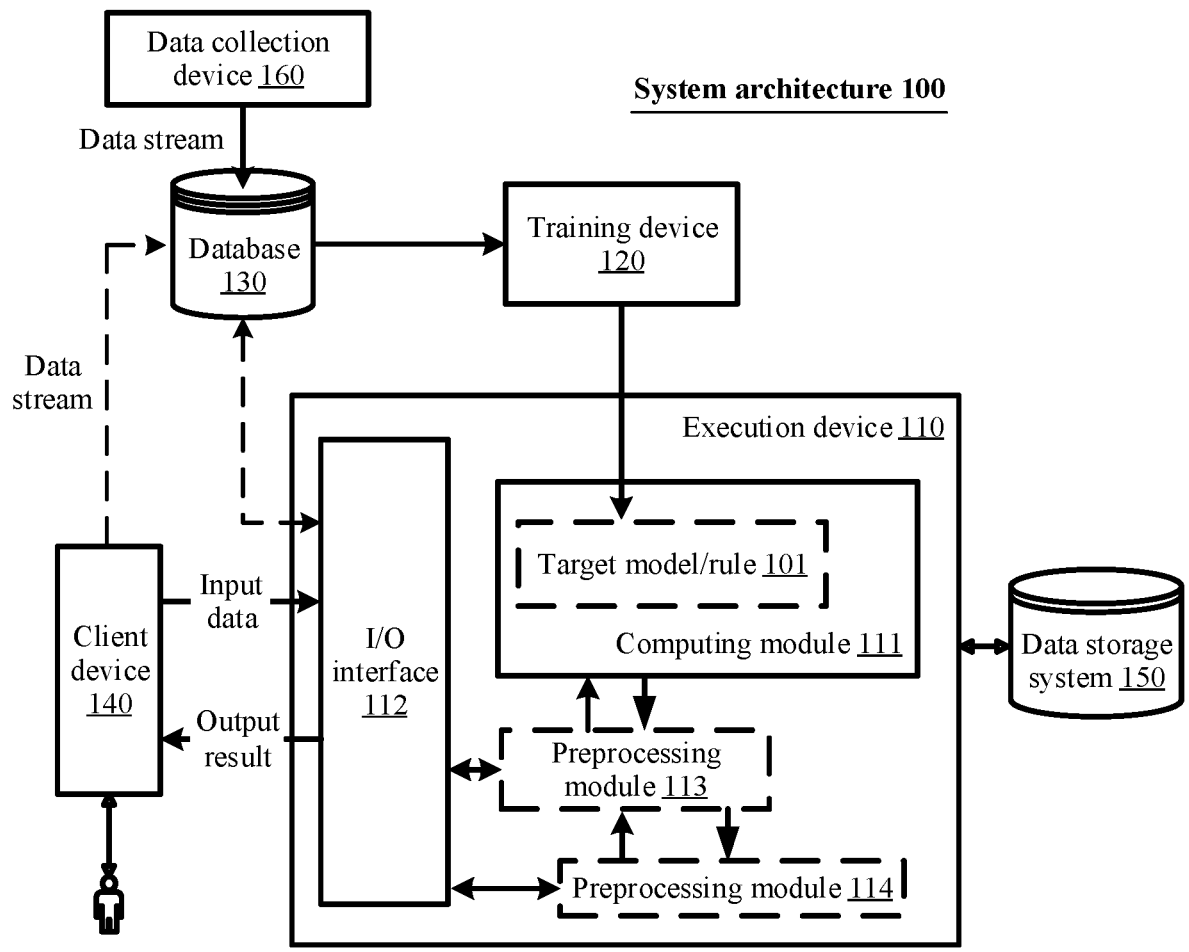
FIG. 2 is a schematic diagram of a system architecture according to an embodiment of this application.

The following describes a system architecture in detail according to an embodiment of this application with reference to FIG. 2. FIG. 2 is a schematic diagram of a system architecture according to an embodiment of this application. As shown in FIG. 2, the system architecture 100 includes an execution device 110, a training device 120, a database 130, a client device 140, a data storage system 150, and a data collection device 160.

In addition, the execution device 110 includes a computing module 111, an I/O interface 112, a preprocessing module 113, and a preprocessing module 114. The computing module 111 may include a target model/rule 101. The preprocessing module 113 and the preprocessing module 114 are optional. The execution device 110 is equivalent to the data center device shown in FIG. 1. Image processing can be performed by using the execution device 110. The client device 140 is equivalent to the electronic device shown in FIG. 1. The client device 140 may input a to-be-processed image to the execution device 110 for processing.

The data collection device 160 is configured to collect training data. For an image processing network training method in this embodiment, the training data may include a training image and a standard image corresponding to the training image. After collecting the training data, the data collection device 160 stores the training data in a database 130. A training device 120 obtains a target model/rule 101 through training based on the training data maintained in the database 130.

In this application, the training image and the standard image corresponding to the training image may be in the following cases:

(1) The training image is an SDR image, and the standard image corresponding to the training image is a corresponding HDR image;

(2) The training image is a low-resolution image, and the standard image corresponding to the training image is a high-resolution image; and (3) The training image is a low-quality image, and the standard image corresponding to the training image is a high-quality image.

The following describes how the training device 120 obtains the target model/rule 101 based on the training data. The training device 120 processes an input training image to obtain a processed image, and compares the processed image with the standard image. Then, an image processing network is updated based on a difference between the processed image and the standard image until the image processing network meets a preset requirement, to complete training of the target model/rule 101. The target model/rule 101 herein is equivalent to an image processing network.

The target model/rule 101 can be used to implement the image processing method in this embodiment. To be specific, the to-be-processed image is input to the target model/rule 101, to obtain the processed image. The target model/rule 101 in this embodiment may specifically be a neural network. It should be noted that, during actual application, the training data maintained in the database 130 is not necessarily collected by the data collection device 160, but may be received from another device. It should be further noted that the training device 120 may not necessarily train the target model/rule 101 completely based on the training data maintained in the database 130, or may obtain training data from a cloud or another place to perform model training. The foregoing description should not be construed as a limitation on the embodiments of this application.

The target model/rule 101 obtained through training by the training device 120 may be applied to different systems or devices, for example, an execution device 110 shown in FIG. 2. The execution device 110 may be a terminal, for example, a mobile phone terminal, a tablet, a laptop computer, an augmented reality (aAR)/virtual reality (VR) device, or a vehicle-mounted terminal, or may be a server, a cloud, or the like. In FIG. 2, the execution device 110 is provided with an input/output (I/O) interface 112, configured to exchange data with an external device. A user may input data to the I/O interface 112 by using a client device 140, where the input data in this embodiment may include a to-be-processed image input by the client device. The client device 140 herein may be specifically a terminal device.

The preprocessing module 113 and the preprocessing module 114 are configured to perform preprocessing based on the input data (for example, the to-be-processed image) received by the I/O interface 112. In this embodiment, the preprocessing module 113 and the preprocessing module 114 may not exist, or there may be only one preprocessing module. If the preprocessing module 113 and the preprocessing module 114 do not exist, the computing module 111 may be directly configured to process the input data.

In a related process in which the execution device 110 preprocesses the input data or the computing module 111 of the execution device 110 performs calculation, the execution device 110 may invoke data, code, and the like in the data storage system 150 for corresponding processing, and may also store data, instructions, and the like obtained through corresponding processing into the data storage system 150.

Finally, the I/O interface 112 presents a processing result (which may specifically be the processed image), for example, the processed image obtained by performing image processing on the to-be-processed image by using the target model/rule 101, to the client device 140, so as to provide the processed image to the user.

Specifically, the processed image obtained by performing image processing by using the target model/rule 101 of the computing module 111 may be processed (for example, image rendering processing is performed) by the preprocessing module 113 (or may be further processed by the preprocessing module 114). The processing result is sent to the I/O interface, and then the I/O interface sends the processing result to the client device 140 for display.

It should be understood that if the preprocessing module 113 and the preprocessing module 114 are not required in the system architecture 100, the processed image obtained through image processing may alternatively be transmitted by the computing module 111 to the I/O interface, and then sent to the client device 140 for display.

It should be noted that the training device 120 may complete the image processing for different targets or referred to as different tasks (for example, the training device may train training images and standard images corresponding to the training images in different scenarios), and generate the corresponding target models/rules 101 based on different training data. The corresponding target model/rule 101 may be used to implement the foregoing objective or complete the foregoing task, to provide a required result for the user.

In FIG. 2, the user may manually enter the input data (where the input data may be the to-be-processed image), and the manual operation may be performed through an interface provided by the I/O interface 112. In another case, the client device 140 may automatically send the input data to the I/O interface 112. If the client device 140 is required to obtain authorization from the user to automatically send the input data, the user may set corresponding permission on the client device 140. The user may view, on the client device 140, a result output by the execution device 110. Specifically, the result may be presented in a form of display, a sound, an action, or the like. The client device 140 may also serve as a data collector to collect, as new sample data, the input data that is input to the I/O interface 112 and an output result that is output from the I/O interface 112 shown in the figure, and store the new sample data in the database 130. Certainly, the client device 140 may alternatively not perform collection. Instead, the I/O interface 112 directly stores, in the database 130 as new sample data, the input data that is input to the I/O interface 112 and the output result that is output from the I/O interface 112 in the figure.

It should be noted that FIG. 2 is merely a schematic diagram of a system architecture according to an embodiment of this application. A location relationship between the devices, the components, the modules, and the like shown in the figure does not constitute any limitation. For example, in FIG. 2, the data storage system 150 is an external storage relative to the execution device 110, but in another case, the data storage system 150 may alternatively be disposed in the execution device 110.

As shown in FIG. 2, the target model/rule 101 obtained through training based on the training device 120 may be a neural network in this embodiment. Specifically, the neural network provided in this embodiment may be a CNN, a deep convolutional neural network (DCNN), or the like.

Figure 3:
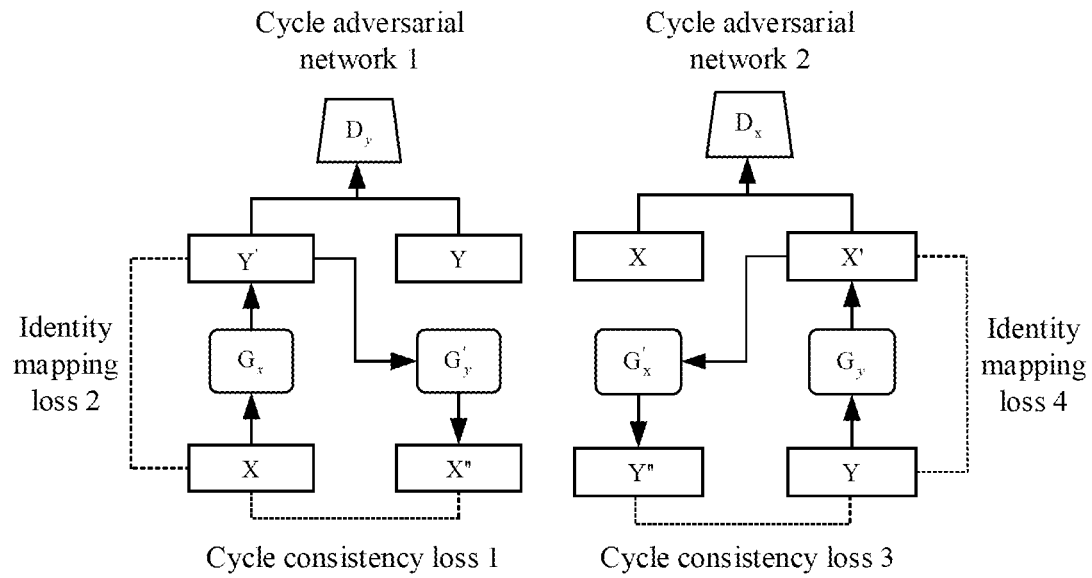
FIG. 3 is a schematic diagram of image processing performed by a dual-path cycle generative adversarial network.

With reference to FIG. 3, the following describes in detail a process of performing image processing by using a dual-path cycle generative adversarial network.

As shown in FIG. 3, the dual-path cycle generative adversarial network includes a cycle adversarial network 1 on the left and a cycle adversarial network 2 on the right. The cycle adversarial network 1 includes two generator networks ($G_x$ and $G'_y$) and one discriminator network ($D_y$). The cycle adversarial network 2 includes two generator networks ($G'_x$ and $G_y$) and one discriminator network ($D_x$).

The four generators in the dual-path cycle generative adversarial network shown in FIG. 3 may have a same network structure, and use a semantic segmentation network (which may be referred to as a U-Net for short, because the U-Net is symmetrically structured, similar to an English letter U). The two discriminator networks may also have a same network structure. One discriminator is configured to distinguish a generated HDR image from a real HDR image, and the other discriminator is configured to distinguish a generated SDR image from a real SDR image. In addition, the U-Net has one encoder and one decoder. The encoder mainly consists of a convolutional layer and a downsampling layer, and is configured to extract an image feature. The decoder mainly consists of a convolutional layer and an upsampling layer, and is configured to decode the image feature into a target-domain image.

Both $G_x$ and $G'_x$ are convertors that convert an SDR image to an HDR image. $G_x$ and $G'_x$ share a convolution parameter, but do not share a parameter of a batch normalization layer. Both $G_y$ and $G'_y$ are inverse converters that convert an SDR image to an HDR image. $G_y$ and $G'_y$ may also share a convolution parameter, but do not share a parameter of a batch normalization layer.

As shown in FIG. 3, specific working processes of processing an image by the dual-path cycle generative adversarial network are as follows:

(1) $G_x$ processes an input image X (the image X is an SDR image) to obtain an image Y' (the image Y' is an HDR image);

(2) $G'_y$ processes an input image Y' (the image Y' is an HDR image) to obtain an image X" (the image X" is an SDR image);

(3) Input the image Y' and the image X" to a discriminator $D_y$, to distinguish a real HDR image from a generated HDR image;

after inputting the image Y' to the discriminator $D_y$, minimize the output of the image Y'; after inputting the image Y to the discriminator $D_y$, maximize the output of the image Y;

(4) $G_y$ processes an input image Y (the image Y is an HDR image) to obtain an image X' (the image X' is an SDR image);

(5) $G'_x$ processes an input image X' (the image X' is an SDR image) to obtain an image Y" (the image Y" is an HDR image); and (6) Input the image Y' and the image X" to the discriminator $D_y$, to distinguish a real SDR image from a generated SDR image;

when inputting the image X' to the discriminator $D_y$, minimize the output of the image X'; and when inputting the image X to the discriminator $D_y$, maximize the output of the image X.

Two cycle consistency losses (loss 1 and loss 3) and two identity mapping losses (loss 2 and loss 4) may be obtained by performing the foregoing processes (1) to (6). The losses are specifically defined as follows:

loss 1 indicates a mean square error (MSE) between the image X and the image X";

loss 2 indicates an MSE between the image X and the image Y';

loss 3 indicates an MSE between the image Y and the image Y"; and loss 4 indicates an MSE between the image X' and the image Y.

Before the SDR image is converted to the HDR images by using the dual-path cycle generative adversarial network, a large amount of training data (including a plurality of SDR images and HDR images corresponding to the plurality of SDR images) may be used to train the dual-path cycle generative adversarial network, and the dual-path cycle generative adversarial network obtained through training may convert the SDR image to the HDR image.

The following briefly describes a training process of the dual-path cycle generative adversarial network.

The dual-path cycle generative adversarial network training specifically includes step S1001 to step S1011. The following describes the steps in detail.

S1001: Input an image X (an SDR image) to a generator $G_x$.

S1002: The generator $G_x$ processes the input image X to obtain an image Y' (an HDR image).

The image X and the image Y' have a same size.

S1003: Input the image Y' to a generator $G'_y$.

S1004: The generator $G'_y$ processes the image Y' to obtain an image X" (an SDR image).

The image X" and the image Y' have a same size.

S1005: Input an image Y (a real HDR image) to a generator $G_y$ for processing.

S1006: The generator $G_y$ processes the input image Y to obtain an image X' (an SDR image).

The image X' and the image Y have a same size.

S1007: Input the image X' (an SDR image) to a generator $G'_x$ for processing, to obtain an image Y".

The image X' and the image Y" have a same size.

S1008: Input the image Y' (an HDR image) to a discriminator $D_y$, and input the image X' (an SDR image) to a discriminator $D_x$.

$D_y$ is a discriminator identifying whether an image is an HDR image, and $D_x$ is a discriminator identifying whether an image is an SDR image.

S1009: Calculate loss functions.

Specifically, loss functions loss 1 to loss 6 need to be calculated in step S1009. loss 1 to loss 6 are specifically defined as follows:

loss 1 indicates an MSE between the image X and the image X";

loss 2 indicates an MSE between the image X and the image Y';

loss 3 indicates an MSE between the image Y and the image Y"; and loss 4 indicates an MSE between the image X' and the image Y.

S1010: Input the image X to the discriminator $D_x$, and input the real HDR image to the discriminator $D_y$.

S1011: Input 0 and output results of the discriminators $D_y$ and $D_x$ in step S1008 to the adversarial loss functions loss 6 and loss 5 respectively, input 1 and output results of the discriminators $D_y$ and $D_x$ in step S1010 to the adversarial loss functions loss 6 and loss 5 respectively, and then add the results of loss 5 and loss 6 to obtain a total loss of the discriminators, to update parameters of the two discriminators through backpropagation.

The dual-path cycle generative adversarial network may be trained through the foregoing steps S1001 to S1011, and then image processing may be performed by using the dual-path cycle generative adversarial network obtained through the training.

Figure 4:
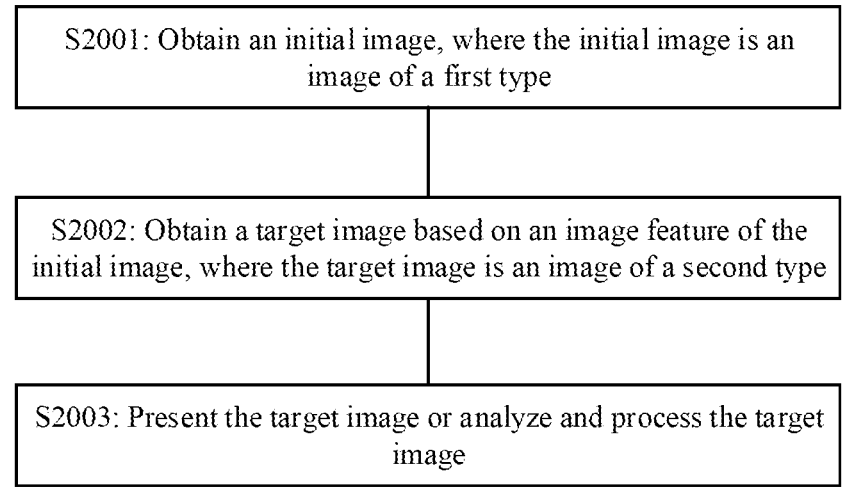
FIG. 4 is a schematic flowchart of an image processing method according to an embodiment of this application.

The following describes the image processing method in this embodiment of this application in detail with reference to FIG. 4.

FIG. 4 is a schematic flowchart of an image processing method according to an embodiment of this application. The method shown in FIG. 4 includes step S2001 to step S2003. The following describes the steps in detail.

S2001: Obtain an initial image, where the initial image is an image of a first type.

S2002: Obtain a target image based on an image feature of the initial image, where the target image is an image of a second type.

The initial image and the target image may be images of different types.

Optionally, the resolution of the target image is higher than the resolution of the initial image.

The initial image may be a low-resolution image, and the target image may be a high-resolution image. The resolution of the initial image can be increased through the method shown in FIG. 4, to obtain the high-resolution target image.

Optionally, image quality of the target image is higher than image quality of the initial image.

The initial image may be a low-quality image, and the target image may be a high-quality image. The low-quality initial image can be restored to the high-quality target image through the method shown in FIG. 4.

Optionally, the initial image is an SDR image, and the target image is an HDR image.

S2003: Present the target image or analyze and process the target image.

In this embodiment, the initial image can be processed based on the image feature of the initial image, to obtain another type of image.

The obtaining a target image based on an image feature of the initial image in step S2002 may be specifically obtaining the target image based on a global image feature and a local image feature of the initial image.

Figure 5:
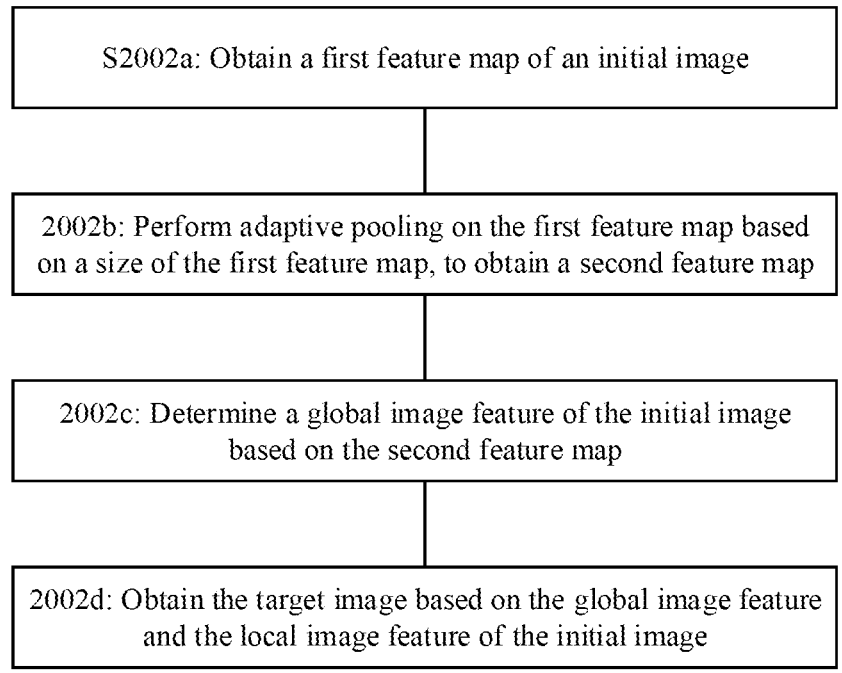
FIG. 5 is a schematic flowchart of obtaining a target image based on an initial image.

With reference to FIG. 5, the following describes in detail a process of obtaining a target image based on an image feature of the initial image in step S2002.

FIG. 5 is a schematic flowchart of obtaining a target image based on an initial image. The process shown in FIG. 5 includes step S2002a to step S2002d. The following describes the steps in detail.

S2002a: Obtain a first feature map of the initial image.

The first feature map is obtained after $L^{th}$ convolution processing is performed on the initial image. The size of the first feature map is M×N, and M and N respectively represent a height and a width of the first feature map. L, M, and N are all positive integers.

Optionally, before step S2001a, the process shown in FIG. 5 further includes the following steps:

S2002e: Perform convolution processing L times on the initial image to obtain a first feature map.

The first feature map of the initial image may be obtained by performing convolution processing one or more times on the initial image. It should be understood that the first feature map may be one feature map, or a plurality of feature maps.

Specifically, if L is 1, the first feature map includes only one feature map: or if L is greater than 1, the first feature map includes a plurality of feature maps.

For example, if L=1, a feature map obtained by performing convolution processing on the initial image once is the first feature map.

For another example, if L=3, a feature map A, a feature map B, and a feature map C may be obtained by separately performing convolution processing three times on the initial image. In this case, the first feature map includes the feature map A, the feature map B, and the feature map C.

S2002b: Perform adaptive pooling on the first feature map based on a size of the first feature map, to obtain a second feature map.

A size of the second feature map is R×S. R and S respectively represent the height and the width of the second feature map, and are preset fixed values.

The performing adaptive pooling on the first feature map in the foregoing step S2002b may be specifically performing average pooling or maximum pooling on the first feature map.

When average pooling is performed on the first feature map, an average value of pixels in an area covered by a sliding window is used as a pooling result. When maximum pooling is performed on the first feature map, a maximum value of pixels in the area covered by the sliding window is used as the pooling result.

Optionally, the performing adaptive pooling on the first feature map in the foregoing step S2002b includes the following steps:

Step 1: Determine a size of the sliding window.

Step 2: Perform adaptive pooling on the first feature map by using the sliding window, to obtain a second feature map.

The sliding window may be a sliding window that matches the size of the first feature map.

Optionally, the step of the sliding window is positively correlated with the size of the first feature map.

A larger first feature map indicates a larger step of the sliding window.

Optionally, the size of the sliding window is positively correlated with the size of the first feature map.

A larger first feature map indicates a larger sliding window.

Specifically, in the foregoing step 1, the sliding window that matches the size of the first feature map may be determined according to formulas (1) to (4).

$$s\_h = M // R \qquad (1)$$

$$s\_w = N // S \qquad (2)$$

$$k\_h = M - (R-1) * s\_h \qquad (3)$$

$$k\_w = N - (S-1) * s\_w \qquad (4)$$

In the foregoing formulas (1) to (4), the size of the sliding window is (k_h, k_w), and the sliding step of the sliding window is (s_h, s_w). k_h and k_w respectively represent the height and the width of the sliding window. s_h and s_w respectively represent horizontal and vertical sliding steps of the sliding window. // represents exact division.

It can be learned from the foregoing formula (1) that the vertical sliding step (s_h) of the sliding window is positively correlated with a width (M) of the first feature map.

It can be learned from the foregoing formula (2) that the horizontal sliding step (s_w) of the sliding window is positively correlated with the height (N) of the first feature map.

It can be learned from the foregoing formula (3) that the height (k_h) of the sliding window is positively correlated with the width (M) of the first feature map.

It can be learned from the foregoing formula (4) that the width (k_w) of the sliding window is positively correlated with the height (N) of the second feature map.

When adaptive pooling is performed on the first feature map by using the sliding window, the first feature map may be slid over from left to right and from top to bottom. The sliding step is (s_h, s_w). A maximum value (or the average value) of an area of an input feature map (k_h, k_w) in the window in each slide is used as a result. In this case, when the entire first feature map is slid over, an output feature map with an expected size (R, S) is obtained.

Figure 6:
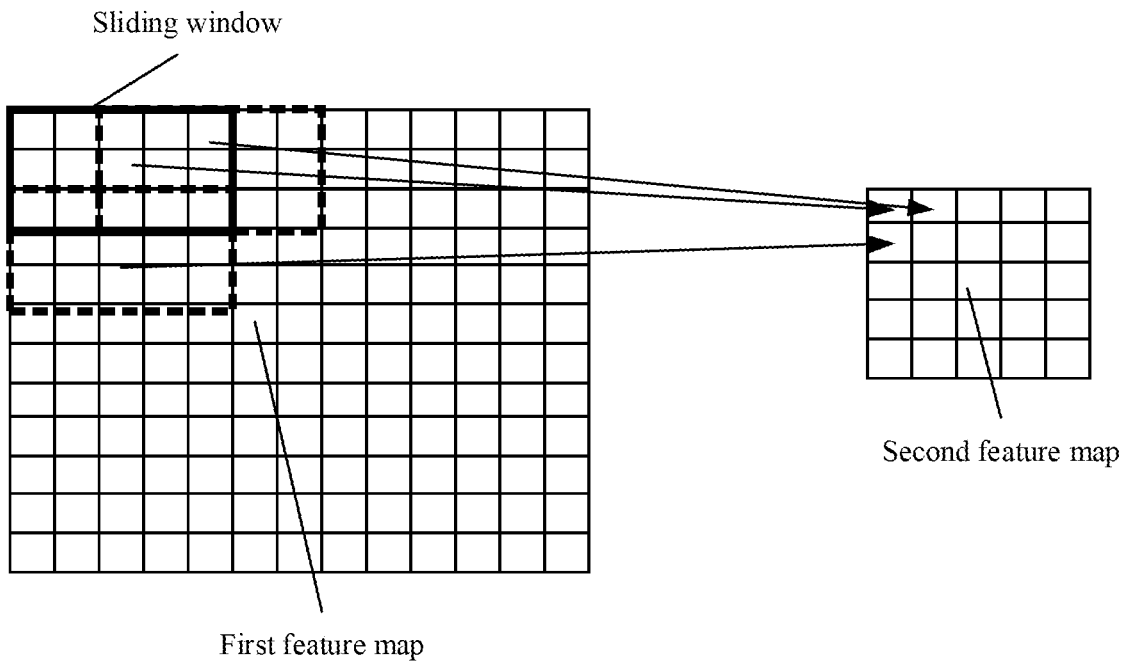
FIG. 6 is a schematic diagram of performing pooling on a first feature map.

For example, as shown in FIG. 6, pooling is performed on the first feature map on the left side of FIG. 6 by using a sliding window, to obtain the second feature map shown on the right side of FIG. 6.

For another example, if the size of the first feature map is (11×13), and the size of the second feature map is (5×5), the size of the sliding window matching the first feature map is (3×5), and the step of the sliding window is (2×2). The first feature map with a size (11×13) is processed by using the sliding window with a size (3×5) and a sliding step (2×2), to obtain the second feature map with a fixed size.

S2002c: Determine a global image feature of the initial image based on the second feature map.

The global image feature of the initial image may be an overall image feature of the initial image, for example, illumination intensity and tone of the initial image.

Generally, a global feature of an image indicates advanced information of the image. For example, the global feature of the image may include a scene category, a theme type, or an overall illumination condition of the image, and such information is useful for a single pixel of the image to determine a local adjustment.

The global image feature of the initial image may be a feature of an image with a size (1×1).

S2002d: Obtain the target image based on the global image feature and the local image feature of the initial image.

The local image feature of the initial image may be obtained by performing convolution processing L times on the initial image. Specifically, the local image feature of the initial image may be the first feature map of the initial image.

The local image feature of the initial image is a feature of a local area in the initial image. For example, when one area in the initial image includes a person and another area includes a cat, the local image feature of the initial image may include a contour feature of the cat in one area, and a contour feature of the person in the another area.

In the foregoing step S2002d, the global image feature and the local image feature of the initial image may be first spliced to obtain a final feature map of the initial image, and then upsampling is performed multiple times on the final feature map of the initial image to obtain the target image.

For example, suppose that a size of the global image feature of the initial image is (1, 1, Z), and a size of the local image feature of the initial image is (P, Q, Z). During splicing, P×Q copies of each channel of the global image feature of the initial image may be first duplicated, and then the duplicated global image feature is connected to the layout image feature in a channel dimension, to obtain the final feature map with a size (P, Q, 2Z). The width and the height of the global image feature are both 1, and a quantity of channels is Z. The width and the height of the local image feature are P and Q, respectively, and a quantity of channels is Z. The width and the height of the final feature image obtained after splicing are P and Q, respectively, and a quantity of channels is 2Z.

Optionally, the obtaining the target image based on the global image feature and the local image feature of the initial image in step S2002d includes:

Step 3: Splice the global image feature and the local image feature of the initial image, to obtain the final feature map of the initial image.

Step 4: Perform upsampling multiple times on the final feature map of the initial image, to obtain the target image.

The performing upsampling multiple times on the final feature map in step 4 may be performing convolution processing and upsampling processing X times on the final feature map, to obtain the target image. X is an integer greater than 1. To be specific, after the final feature map of the initial image is obtained, convolution processing and upsampling processing may be first performed once on the final feature map, and then convolution processing and upsampling processing are performed once again, until a quantity of times of convolution processing and a quantity of times of upsampling processing each reach X. A value of X may be determined based on empirical data, while ensuring that a size of an image obtained after $X^{th}$ upsampling is consistent with a size of an original image.

In this embodiment, the adaptive pooling is performed on the feature map of the initial image to obtain the feature map of a fixed size. This facilitates subsequent extraction of the global image feature of the initial image, to improve flexibility of image processing.

Specifically, during image processing, it is usually necessary to obtain the global image feature of the image, but obtaining global image features of images of different sizes usually needs networks or generators of different structures. Therefore, before the global feature of the image is obtained, the image is first processed to obtain the feature map of the fixed size, and then the image global feature is extracted based on the feature map of the fixed size. This can greatly improve flexibility of the image processing, and enable a network or an image processor of a same structure to extract the global image features of the images of different sizes, so as to process the images of different sizes.

In addition, the process shown in FIG. 5 may also be applied to a neural network training process. When the neural network is trained by using the process shown in FIG. 5, a plurality of training images of different sizes can be used to train the neural network. Compared with a conventional solution, images of different sizes can be used to train the neural network, to improve training effect to some extent.

It should be understood that L may be a total quantity of times of all convolution processing performed on the initial image. In other words, after the $L^{th}$ convolution processing is performed on the initial image, the convolution processing on the initial image is completed. The convolution processing may not be performed on the initial image subsequently, instead, convolution processing is performed on the final feature map of the initial image.

Alternatively, L may be a quantity of times of some convolution processing performed on the initial image. After the $L^{th}$ convolution processing is performed on the initial image, the first feature map may be obtained. Then, the second feature map of a fixed size is obtained based on the first feature map, and the global image feature of the initial image is obtained based on the second feature map. Next, convolution processing may be further performed on the initial image, to obtain the local image feature of the initial image.

In addition, the image processing method in this embodiment may be performed by a convolutional neural network. In this case, the foregoing adaptive operation may be performed at a penultimate layer output by the convolutional neural network. The convolutional neural network herein may include a deep residual network (ResNet), a feature pyramid network (FPN), and the like.

The initial image may be an SDR image, and the target image may be an HDR image. According to the method shown in FIG. 4, a plurality of SDR images of different sizes can be converted to HDR images, to improve flexibility of converting the SDR images to the HDR images.

In addition, the initial image may be a low-quality image, and the target image may be a high-quality image obtained by restoring the initial image. In this case, according to the image processing method in this embodiment, images of different sizes can be processed by using a same image generator, to obtain a high-quality image.

Alternatively, the initial image may be a low-resolution image, and the target image may be a high-resolution image. In this case, according to the image processing method in this embodiment of this application, images of different sizes can be processed by using a same image generator, to obtain a high-resolution image.

The method shown in FIG. 4 may be performed by an image processing apparatus. The image processing apparatus may be an apparatus implemented based on the dual-path cycle generative adversarial network shown in FIG. 2.

When the image processing apparatus is an apparatus implemented based on the dual-path cycle generative adversarial network shown in FIG. 2, a specific process of processing an image by the generator and a discriminator is as follows.

A specific process of processing an image by the generator includes the following step A to step J. The following separately describes the steps in detail.

Step A: Input an initial image of any size to the generator.

It is assumed that the initial image is an RGB three-channel image, and the height and the width of the initial image are H and W, respectively.

Step B: Perform convolution processing on the initial image by using a convolution kernel with a step being 1, to generate a feature map A that has the same size as the initial image and that has 16 channels.

Step C: Perform a convolution operation with a step being 2, batch normalization, and an activation function operation on the first feature map to extract a deeper feature of the initial image layer by layer, successively reduce a size of the feature image by ½, and successively increase a quantity of channels of the image onefold, until a feature map B with a size (H/16, W/16) is obtained.

Step D: Perform adaptive pooling on the feature map B based on a size of the feature map B to obtain a feature map C with a fixed size (16, 16).

The processing process of the feature map B in step D is the same as the processing process of the first feature map in step S2002b. For a specific processing process, refer to related descriptions of step S2002b.

Step E: Perform convolution processing on the feature map C once with a step being 2, to obtain a feature map D with a size (8, 8) and 128 channels.

Step F: Perform convolution processing on the feature map D by using an 8×8 convolution kernel, to obtain a global feature map of the initial image with a size (1, 1) and 128 channels.

Step G: Duplicate H/16×W/16 copies of the global feature map to obtain a global feature map with a size (H/16, W/16), and connect to a local image feature (that is, the feature map B obtained in step C) with a size (H/16, W/16). In this way, a final feature map of the initial image is obtained. The final feature map of the initial image includes both the local feature and the global feature.

Step H: Perform convolution processing with a side length of 1, upsampling, batch normalization, and an activation function operation on the final feature map, increase an image size of the final feature map layer by layer, connect an image feature obtained at each layer to a previous layer corresponding to the image size, and finally obtain a target image with the same size as the initial image.

Step I: Add the initial image and the target image obtained in step I pixel by pixel, and use the obtained image as a final output image of the generator.

The discriminator processes the image as the following steps.

A specific process of processing an image by the discriminator includes the following step X to step W. The following separately describes the steps in detail.

Step X: Input an input image of any size to the discriminator for processing.

It is assumed that the input image is an RGB three-channel image, and the height and the width of the input image are H and W, respectively.

Step Y: Perform a convolution operation with a step being 1, batch normalization, and an activation function operation on an initial image, to generate a feature map RI that has the same size as the input image and that has 16 channels.

Step Z: Perform a convolution operation with a step being 2, batch normalization, and an activation function operation on the feature map RI to extract a deeper feature of the initial image layer by layer, successively reduce a size of the feature image by ½, and successively increase a quantity of channels of the image onefold.

Step W: When the size of the feature map is reduced to (H/32, W/32), use a fully connected layer as an output layer to output a value, which is maximized or minimized by a loss function of the discriminator.

The foregoing describes in detail the image processing method in the embodiments of this application with reference to the accompanying drawings. The following describes an image processing network training method in the embodiments of this application with reference to the accompanying drawings.

Figure 7:
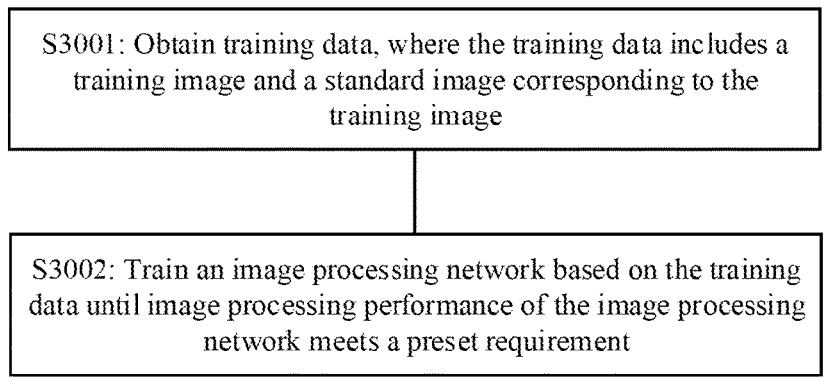
FIG. 7 is a schematic flowchart of an image processing network training method according to an embodiment of this application.

FIG. 7 is a schematic flowchart of an image processing network training method according to an embodiment of this application. The method shown in FIG. 7 may be performed by an apparatus including the image processing network. The image processing network obtained through training through the method shown in FIG. 7 may perform the image processing method shown in FIG. 4. The method shown in FIG. 7 includes step S3001 to step S3002. The following describes the two steps in detail.

S3001: Obtain training data, where the training data includes a training image and a standard image corresponding to the training image.

Optionally, the training image and the standard image corresponding to the training image that are included in the training data are specifically as follows:

(1) The training image is an SDR image, and the standard image corresponding to the training image is a corresponding HDR image;

(2) The training image is a low-resolution image, and the standard image corresponding to the training image is a high-resolution image; and (3) The training image is a low-quality image, and the standard image corresponding to the training image is a high-quality image.

S3002: Train the image processing network based on the training data until image processing performance of the image processing network meets a preset requirement.

The image processing network may be a neural network that can process an image, for example, a convolutional neural network or a dual-path cycle generative adversarial network.

The training the image processing network based on the training data in the foregoing step 3002 may specifically be processing the training image by using the image processing network to obtain a processed image, comparing the processed image with the standard image, and updating the image processing network based on a difference between the processed image and the standard image until the image processing network meets the preset requirement.

The foregoing process of processing the training image by using the image processing network may be steps S2002a to S2002d in the method shown in FIG. 5. For details, refer to the foregoing related descriptions of steps S2002a to S2002d.

The foregoing describes in detail the image processing method in the embodiments of this application with reference to the accompanying drawings. The following describes an image processing apparatus in the embodiments of this application with reference to FIG. 8 and FIG. 9. It should be understood that the image processing apparatus shown in FIG. 8 and FIG. 9 can perform the image processing method in the embodiments of this application.

Figure 8:
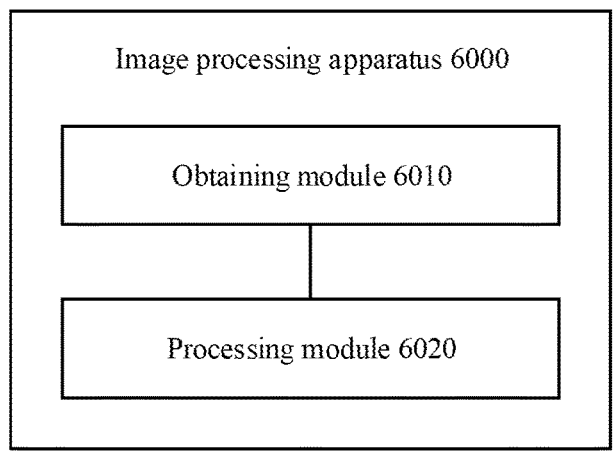
FIG. 8 is a schematic block diagram of an image processing apparatus according to an embodiment of this application.

FIG. 8 is a schematic block diagram of an image processing apparatus according to an embodiment of this application. As shown in the figure, the image processing apparatus 6000 includes an obtaining module 6010 and a processing module 6020. The image processing apparatus 6000 may perform the image processing method in the embodiment of this application, specifically, the method shown in FIG. 4.

When the image processing apparatus 6000 performs the method shown in FIG. 4, the obtaining module 6010 may perform step S2001, and the processing module 6020 may perform steps S2002 and S2003. Further, the processing module 6020 may further perform steps 2002a to 2002d in the process shown in FIG. 5.

It should be understood that the obtaining module 6010 and the processing module 6020 in the image processing apparatus 6000 shown in FIG. 8 are merely modules obtained based on logical function division. Actually, the image processing apparatus 6000 may be further divided into other functional modules based on a specific process of processing an image by the image processing apparatus 6000. For example, when the image processing apparatus 6000 pools a feature map, the pooling may be specifically performed by a pooling module in the image processing apparatus 6000. When the image processing apparatus 6000 performs upsampling processing on the feature map, the upsampling may be specifically performed by an upsampling module in the image processing apparatus 6000. The pooling module and the upsampling module that are used as examples herein may be modules further divided by the processing module 6020.

Figure 9:
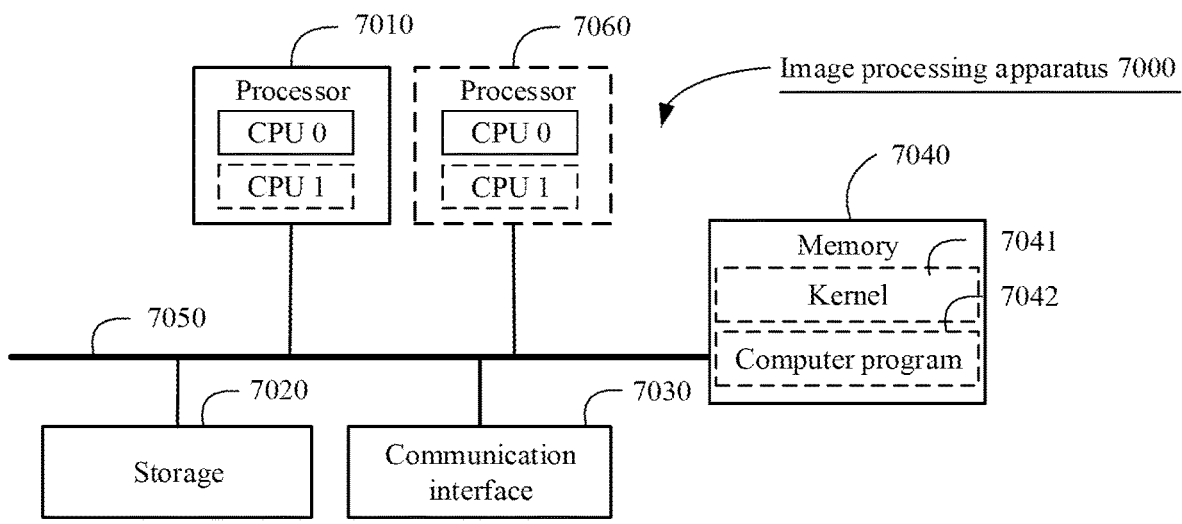
FIG. 9 is a schematic block diagram of an image processing apparatus according to an embodiment of this application.

FIG. 9 is a schematic block diagram of an image processing apparatus according to an embodiment of this application. As shown in the figure, the image processing apparatus 7000 includes a processor 7010, a storage 7020, a communication interface 7030, a memory 7040, and a bus 7050. Further, in addition to the processor 7010, the image processing apparatus 7000 may further include a processor 7060. A quantity of processors included in the image processing apparatus 7000 is not limited in this application. The following describes the modules or units in detail.

The processor 7010 may be a general-purpose central processing unit (CPU). For example, as shown in FIG. 9, the processor 7010 includes a CPU 0 and a CPU 1. In addition to the case shown in FIG. 9, the processor 7010 may be a microprocessor, an application-specific integrated circuit (ASIC), a graphics processing unit (GPU), or one or more integrated circuits, and is configured to execute a related program to implement the image processing method in the method embodiment of this application. Alternatively, the processor 7010 may be an integrated circuit chip and has a signal processing capability. In an implementation process, the steps of the image processing method in this application may be completed by using a hardware integrated logic circuit or an instruction in a form of software in the processor 7010. The foregoing processor 7010 may be further a general-purpose processor, a digital signal processor (DSP), a field programmable gate array (FPGA) or another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. Steps of the methods disclosed in this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the storage 7020. The processor 7010 reads information in the storage 7020, and completes, in combination with hardware of the processor 7010, functions that need to be performed by units included in the neural network construction apparatus, or performs the image processing method in the method embodiments of this application. In addition, the foregoing explanations and limitations of the processor 7010 are also applicable to the processor 7010.

The storage 7020 may be a read-only memory (ROM), a static storage device, a dynamic storage device, or a random access memory (RAM). The storage 7020 may store a program. When the program stored in the storage 7020 is executed by the processor 7010, the processor 7010 is configured to perform the steps of the image processing method in the embodiments of this application.

The communication interface 7030 may use a transceiver apparatus, for example, but not limited to, a transceiver, to implement communication between the apparatus 7000 and another device or a communication network. For example, a to-be-processed image may be obtained through the communication interface 7003.

The memory 7040 may include a kernel 7041 and a computer program 7042. The memory 7040 is a bridge for communication between the storage 7020 and the processor 7010. All programs in the image processing apparatus 7000 are run in the memory 7040. The memory 7040 may be configured to temporarily store operation data (for example, intermediate data obtained by processing an image) in the processor 7010 and data exchanged with an external storage such as a hard disk. When the image processing apparatus 7000 runs, the processor 7010 invokes data (for example, a to-be-processed initial image) that needs to be computed to the memory 7040 for computation. After the computation is completed, the processor transmits a result (for example, a target image obtained by processing the initial image) to the memory 7040.

The bus 7050 may include a path for transmitting information between components (for example, the processor 7010, the storage 7020, and the communication interface 7030) of the image processing apparatus 7000. In addition to a data bus, the bus 7050 may further include a power bus, a control bus, a status signal bus, and the like. However, for clear description, various types of buses in the figure are denoted as the bus 7050. Optionally, the bus 7050 may alternatively be an in-vehicle Ethernet bus, a controller area network (CAN) bus, or another internal bus.

It should be noted that although only the storage, the processor, the communication interface, and the like in the image processing apparatus 7000 are illustrated, in a specific implementation process, a person skilled in the art should understand that the image processing apparatus 7000 may further include another component for normal running. In addition, according to a specific requirement, a person skilled in the art should understand that the image processing apparatus 7000 may further include hardware components for implementing other additional functions.

It should be understood that the obtaining module 6010 in the image processing apparatus 6000 may be equivalent to the communication interface 7030 in the image processing apparatus 7000. The processing module 6020 in the image processing apparatus 6000 may be equivalent to the processor 7010 and/or the processor 7060 in the image processing apparatus 7000.

This application further provides an intelligent automobile including the image processing apparatus 7000 shown in FIG. 9. The image processing apparatus 7000 is configured to implement a function of a corresponding execution body in the foregoing method.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded or executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing method comprising:
   obtaining an initial image, wherein the initial image is of a first type;
   obtaining a target image based on a global image feature and a local image feature of the initial image, wherein the target image is of a second type; and
   generating for display an interface presenting the target image or analyzing and processing the target image,
   wherein the global image feature of the initial image is determined based on a second feature map of the initial image that is obtained through performing adaptive pooling on a first feature map of the initial image,
   wherein the first feature map of the initial image is obtained through convolution processing on the initial image, and
   wherein the second feature map of the initial image is a fixed-size feature map.

2. The image processing method according to claim 1, wherein the local image feature of the initial image is obtained through convolution processing on the initial image.

3. The image processing method according to claim 1, wherein the obtaining the global image feature of the initial image comprises:
   obtaining the first feature map of the initial image, wherein the first feature map is obtained after $L^{th}$ convolution processing is performed on the initial image, a size of the first feature map is M×N, and L, M, and N are positive integers;
   performing adaptive pooling on the first feature map based on the size of the first feature map to obtain the second feature map, wherein a size of the second feature map is R×S, and R and S are preset fixed values and positive integers; and
   determining the global image feature of the initial image based on the second feature map.

4. The image processing method according to claim 3, wherein the performing adaptive pooling on the first feature map based on the size of the first feature map to obtain the second feature map comprises:
   performing pooling on the first feature map by using a sliding window, to obtain the second feature map, wherein a size of the sliding window and a sliding step of the sliding window are determined based on the sizes of the first feature map and the second feature map.

5. The image processing method according to claim 4, wherein the size of the sliding window and the sliding step of the sliding window are determined according to the following formulas:

$$s\_h = M // R;$$

$$s\_w = N // S;$$

$$k\_h = M - (R-1)*s\_h; \text{ and}$$

$$k\_w = N - (S-1)*s\_w, \text{ wherein}$$

the size of the sliding window is (k_h, k_w), the sliding step of the sliding window is (s_h, s_w), and // represents exact division.

6. The image processing method according to claim 1, wherein the obtaining the target image based on a global image feature and a local image feature of the initial image comprises:
   obtaining a final feature map of the initial image based on the global image feature and the local image feature of the initial image; and
   performing upsampling multiple times on the final feature map of the initial image, to obtain the target image.

7. The image processing method according to claim 6, wherein the obtaining a final feature map of the initial image based on the global image feature and the local image feature of the initial image comprises:
   splicing the global image feature and the local image feature of the initial image, to obtain the final feature map of the initial image.

8. The image processing method according to claim 1, wherein the initial image is a standard dynamic range (SDR) image, and the target image is a high dynamic range (HDR) image.

9. The image processing method according to claim 1, wherein the method comprises analyzing and processing the target image, and the analyzing and processing the target image comprises:
   performing image classification or recognition processing on the target image, to obtain a processing result of the target image.

10. A controller, comprising:
    at least one processor; and
    a non-transitory computer-readable storage medium coupled to the at least one processor and storing programming instructions that, when executed by the at least one processor, instruct the controller to perform an image processing method including the operations comprising:
    obtaining an initial image, wherein the initial image is of a first type;
    obtaining a target image based on a global image feature and a local image feature of the initial image, wherein the target image is of a second type; and
    generating for display an interface presenting the target image or analyzing and processing the target image,
    wherein the global image feature of the initial image is determined based on a second feature map of the initial image that is obtained through performing adaptive pooling on a first feature map of the initial image,
    wherein the first feature map of the initial image is obtained through convolution processing on the initial image, and
    wherein the second feature map of the initial image is a fixed-size feature map.

11. The controller according to claim 10, wherein the local image feature of the initial image is obtained through convolution processing on the initial image.

12. The controller according to claim 10, wherein the programming instructions, when executed by the at least one processor, further instruct the controller to perform operations comprising:

obtaining the first feature map of the initial image, wherein the first feature map is obtained after $L^{th}$ convolution processing is performed on the initial image, a size of the first feature map is M×N, and L, M, and N are positive integers;

performing adaptive pooling on the first feature map based on the size of the first feature map to obtain the second feature map, wherein a size of the second feature map is R×S, and R and S are preset fixed values and positive integers; and determining the global image feature of the initial image based on the second feature map.

13. The controller according to claim 12, wherein the programming instructions, when executed by the at least one processor, further instruct the controller to perform operations comprising:

performing pooling on the first feature map by using a sliding window, to obtain the second feature map, wherein a size of the sliding window and a sliding step of the sliding window are determined based on the sizes of the first feature map and the second feature map.

14. The controller according to claim 13, wherein the size of the sliding window and the sliding step of the sliding window are determined according to the following formulas:

$s\_h=M//R;$ $s\_w=N//S;$ $k\_h=M-(R-1)*s\_h;$ and $k\_w=N-(S-1)*s\_w,$ wherein the size of the sliding window is (k_h, k_w), the sliding step of the sliding window is (s_h, s_w), and // represents exact division.

15. The controller according to claim 10, wherein the programming instructions, when executed by the at least one processor, further instruct the controller to perform operations comprising:

obtaining a final feature map of the initial image based on the global image feature and the local image feature of the initial image; and performing upsampling multiple times on the final feature map of the initial image, to obtain the target image.

16. The controller according to claim 15, wherein the programming instructions, when executed by the at least one processor, further instruct the controller to perform operations comprising:

splicing the global image feature and the local image feature of the initial image, to obtain the final feature map of the initial image.

17. The controller according to claim 10, wherein the second feature map is obtained through adaptive pooling performed on the first feature map using a sliding window and using average pooling.

18. The controller according to claim 10, wherein the second feature map is obtained through adaptive pooling performed on the first feature map using a sliding window and using maximum pooling.

19. The method according to claim 1, wherein the second feature map is obtained through adaptive pooling performed on the first feature map using a sliding window and using average pooling.

20. The method according to claim 1, wherein the second feature map is obtained through adaptive pooling performed on the first feature map using a sliding window and using maximum pooling.

* * * * *